United States Patent
Modrzejewski et al.

(10) Patent No.: US 9,051,986 B2
(45) Date of Patent: Jun. 9, 2015

(54) HYBRID FLUID ELASTOMERIC DAMPER

(71) Applicant: BELL HELICOPTER TEXTRON INC., Fort Worth, TX (US)

(72) Inventors: Brian Modrzejewski, Keller, TX (US); Bryan Judd, Arlington, TX (US); Dan Sottiaux, Flower Mound, TX (US); Frank B. Stamps, Colleyville, TX (US); Emily Schofield, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 13/832,975

(22) Filed: Mar. 15, 2013

(65) Prior Publication Data
US 2014/0262645 A1 Sep. 18, 2014

(51) Int. Cl.
| | |
|---|---|
| *F16F 9/52* | (2006.01) |
| *F16F 1/36* | (2006.01) |
| *B64C 27/35* | (2006.01) |
| *B64C 27/51* | (2006.01) |
| *F16F 9/53* | (2006.01) |
| *F16F 9/32* | (2006.01) |
| *F16F 13/06* | (2006.01) |

(52) U.S. Cl.
CPC . *F16F 1/36* (2013.01); *B64C 27/35* (2013.01); *B64C 27/51* (2013.01); *F16F 9/532* (2013.01); *F16F 1/3615* (2013.01); *F16F 9/3292* (2013.01); *F16F 13/06* (2013.01)

(58) Field of Classification Search
CPC ............ F16F 9/52; F16F 9/526; F16F 9/535; F16F 15/023; F16F 15/04
USPC .................... 188/266, 267.1, 266.7, 268, 276
See application file for complete search history.

(56) References Cited

U.S. PATENT DOCUMENTS

| | | | | |
|---|---|---|---|---|
| 5,076,403 | A * | 12/1991 | Mitsui ........................ | 188/267.1 |
| 5,967,268 | A * | 10/1999 | de Molina et al. ............ | 188/277 |
| 6,247,683 | B1 * | 6/2001 | Hayakawa et al. ......... | 267/64.11 |
| 6,260,677 | B1 * | 7/2001 | Hayakawa et al. .......... | 188/274 |
| 6,318,521 | B1 * | 11/2001 | Niaura et al. .............. | 188/267.1 |
| 6,328,144 | B1 * | 12/2001 | Hayakawa et al. ........ | 188/299.1 |
| 2008/0044283 | A1 | 2/2008 | Schmaling | |
| 2008/0111334 | A1 * | 5/2008 | Inoue et al. ................ | 280/124.1 |
| 2009/0078538 | A1 * | 3/2009 | Swinderman et al. ........ | 198/499 |
| 2010/0032254 | A1 * | 2/2010 | Anderfaas et al. ......... | 188/267.2 |

(Continued)

FOREIGN PATENT DOCUMENTS

| | | |
|---|---|---|
| EP | 1065405 | 1/2001 |
| GB | 2155143 | * 9/1985 |

OTHER PUBLICATIONS

European Office Action dated Feb. 4, 2014 from counterpart EP App. No. 13166914.5.
European Office Action dated Feb. 20, 2014 from counterpart EP App. No. 13166914.5.

(Continued)

*Primary Examiner* — Vishal Sahni
(74) *Attorney, Agent, or Firm* — James E. Walton; Richard G. Eldredge

(57) ABSTRACT

A damper includes a housing that forms a fluidly sealed cavity for receiving a fluid therein. The fluid is configured to change fluid properties as electrical energy is induced. An electrical subsystem provides electrical energy to the fluid, which is monitored with a control subsystem. The method includes inducing the fluid with electrical energy to change the dampening effects of the damper in real time.

5 Claims, 4 Drawing Sheets

(56) References Cited

U.S. PATENT DOCUMENTS

2011/0180684 A1* 7/2011 West et al. .................. 248/557
2012/0193919 A1* 8/2012 Kuriki .......................... 290/52

OTHER PUBLICATIONS

Canadian Office Action dated Feb. 10, 2015 from counterpart CA App. No. 2,844,214.

* cited by examiner

US 9,051,986 B2

HYBRID FLUID ELASTOMERIC DAMPER

BACKGROUND

1. Field of the Invention

The present application relates generally to damper systems, and more specifically, to damper systems for aircraft.

2. Description of Related Art

Dampers are well known in the art for effectively dampening adverse forces exerted on a structure. Rotary aircraft utilize dampers to dampen forces, e.g., lead/lag forces, exerted on the components of the rotor system via the rotor blades during flight. The dampers are typically manufactured with one or more elastomeric materials that are configured to dampen the forces. In some embodiments, the dampers could utilizes a plurality of fluid chamber in communication with each other, wherein movement of the damper means disposed within the damper causes the fluid carried within the chambers to pass through a common passage, which in turn dampens the adverse forces.

It should be understood that rotary aircraft must undergo preflight preparations to "warm" the dampers prior to flight. Current methods to prepare the dampers for flight include operating the aircraft at non-flight conditions. The process exhausts considerable time, resulting in significant costs.

Another problem associated with conventional dampers is the inability to change the spring rate of the damper in real time. For example, the aircraft operates at various flight conditions, which affects the damper's performance. In some cases, it is possible to fly outside the designed damper spring rate, thus greatly reducing the efficiency of the damper.

Although the foregoing developments in dampers represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
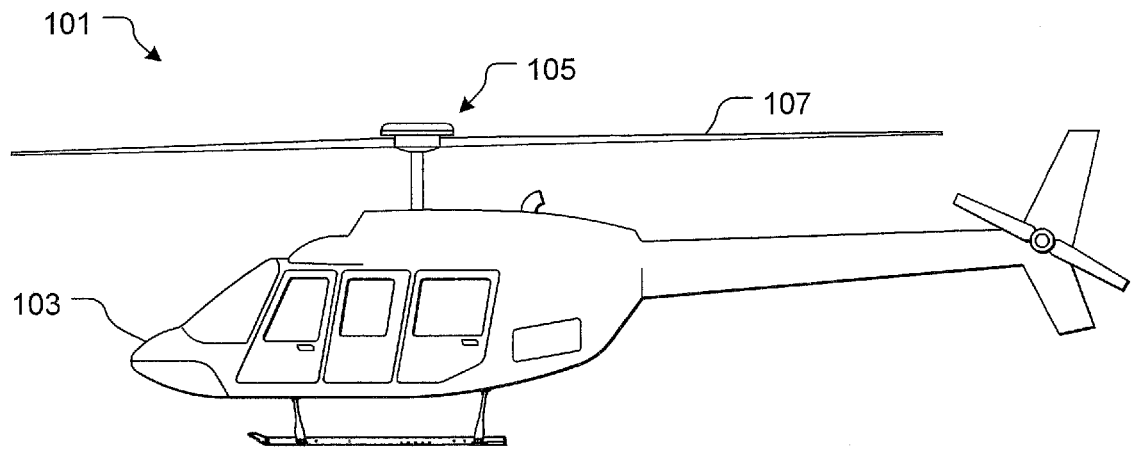
FIG. 1 is a side view of a helicopter according to a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of the present application overcome the above-listed problems commonly associated with conventional dampers. Specifically, the system includes a damper associated with a heater for providing heat to the dampening means disposed within the damper. This feature greatly reduces the time exhausted for preparing the aircraft for flight. The system is further provided with fluid configured to change viscosity as electrical energy is received, which in turn changes the damper spring rate. This feature allows real time regulation of the damper spring rate for optimal performance during flight. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Figure 2:
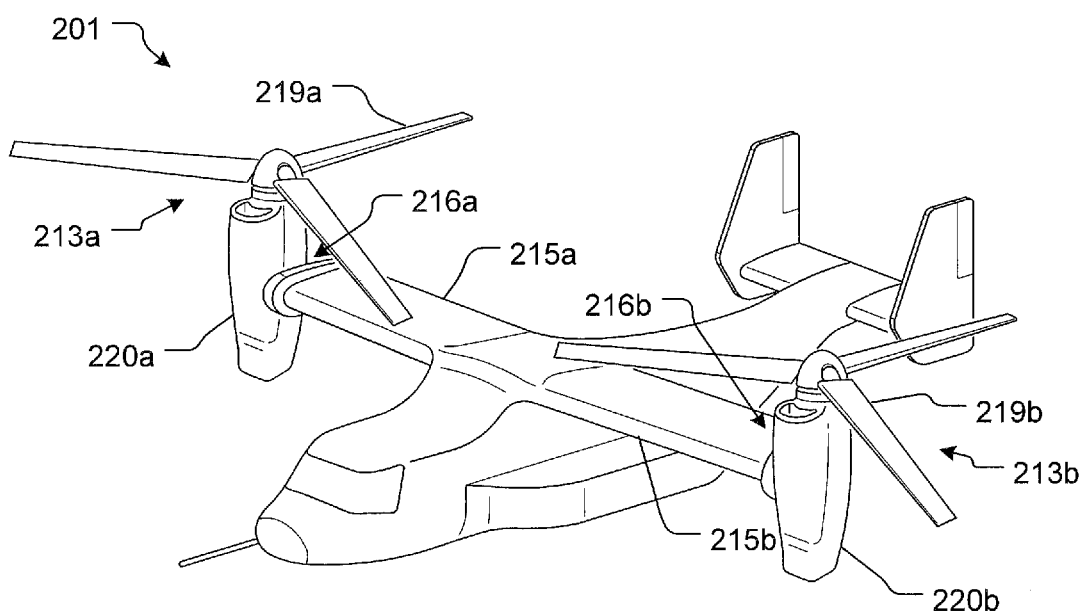
FIG. 2 is a perspective view of a tiltrotor aircraft according to another preferred embodiment of the present application.

Although shown associated with a helicopter, it will be appreciated that the damper system of the present application could also be utilized with different types of rotary aircraft and vehicles. For example, FIG. 2 illustrates a tiltrotor aircraft 201 that utilizes the damper system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

Figure 3:
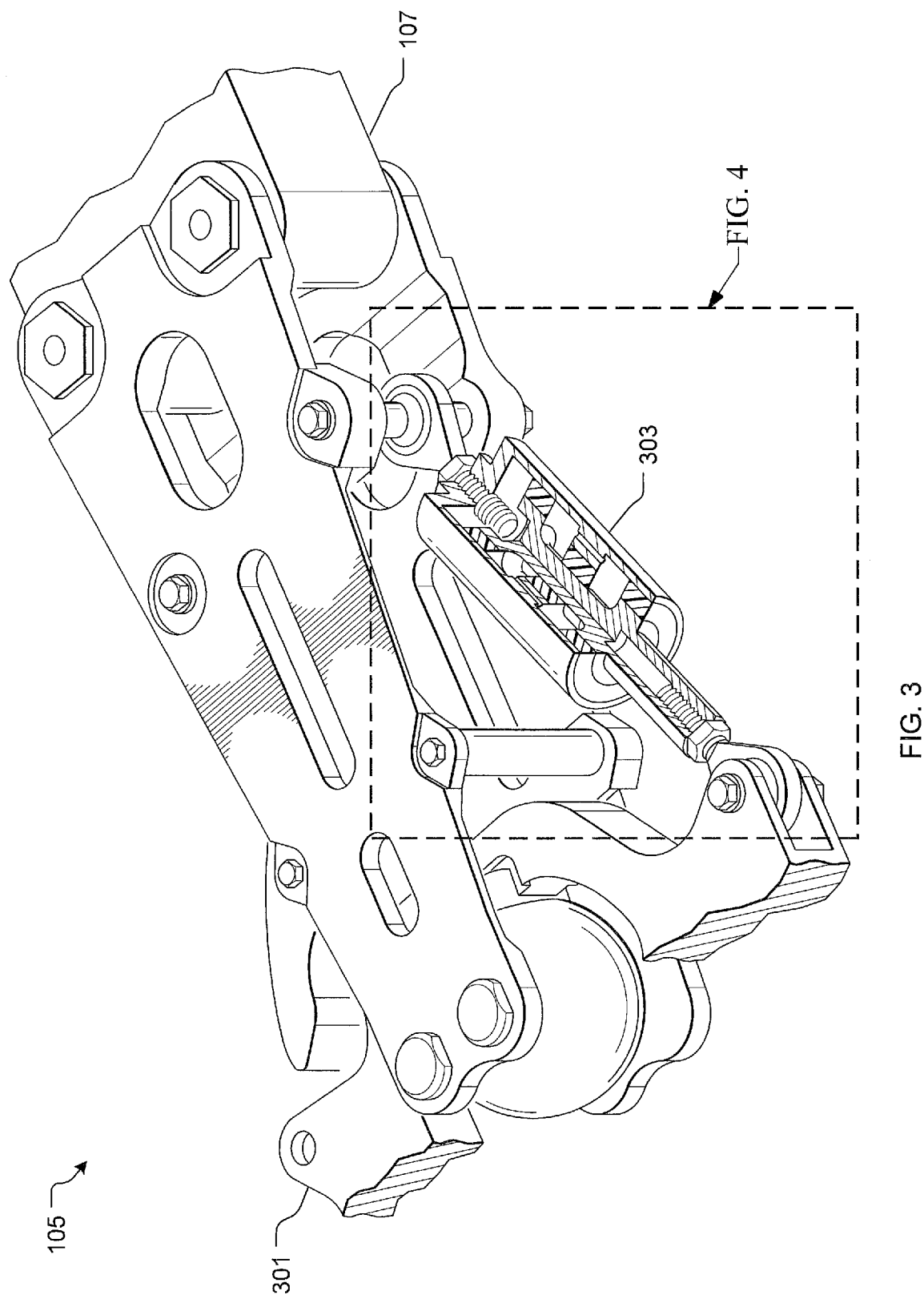
FIGS. 3 and 4 are perspective views of a rotary system of FIG. 1.
Figure 4:
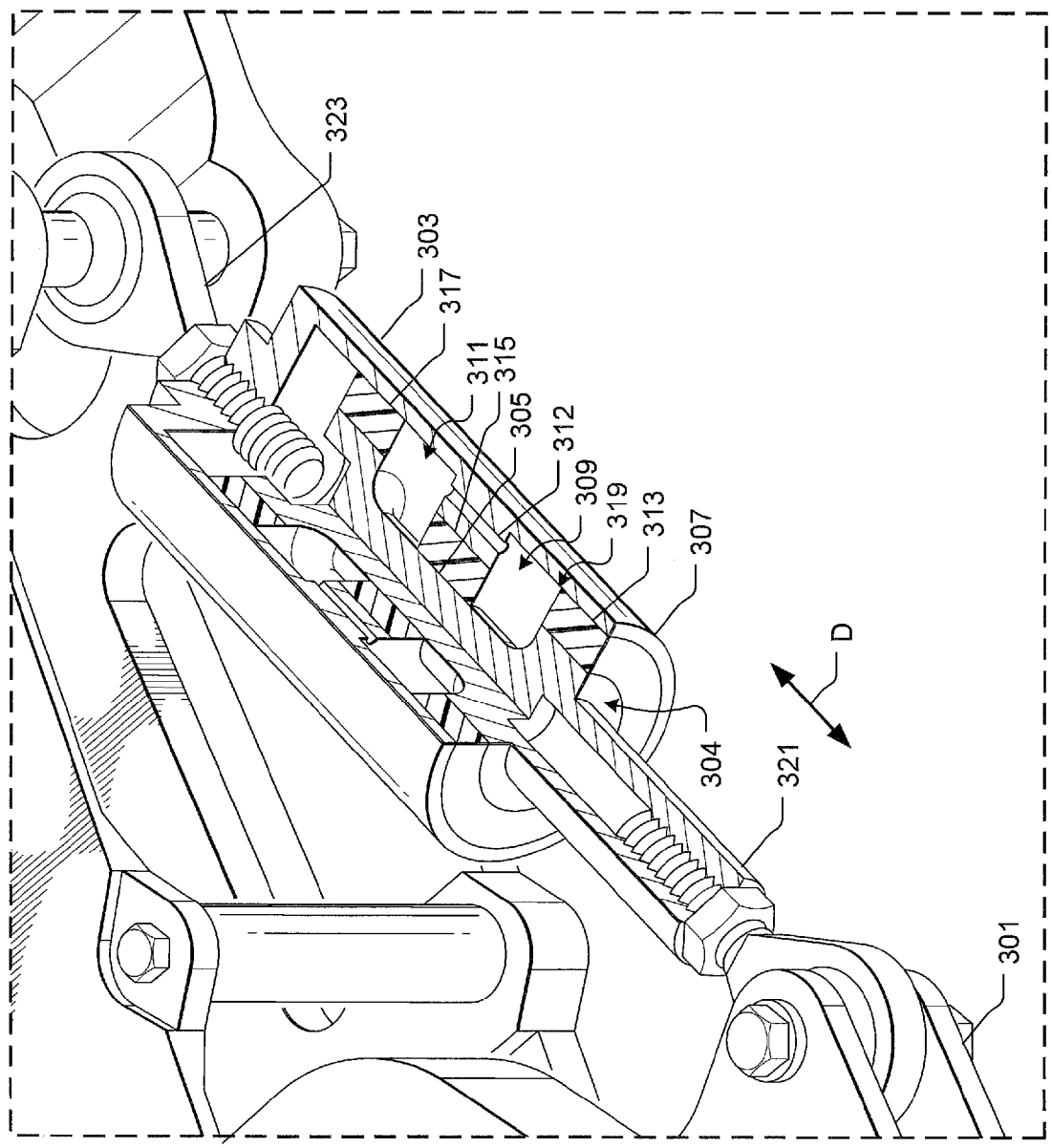

FIGS. 3 and 4 depict perspective views of rotor system 105 having a yoke 301 rotatably attached to rotor blade 107. A damper 303 is shown operably attached to both yoke 301 and blade 107. During operation, damper 303 dampens the forces exerted on the yoke via the blade.

In the exemplary embodiment, damper 303 is shown operably associated with the rotor system; however, it will be appreciated that the features of the damper system discussed herein could also be utilized on one or more different systems and devices of the aircraft and should not be narrowly construed as limited to rotor systems.

Damper 303 includes a dampening device 304 configured to dampen forces exerted against damper 303, which in the preferred embodiment, is a piston 305 disposed within a housing 307 and situated between two fluid chambers 309 and 311. A passageway 312 extending through the thickness of piston 305 provides fluid communication between the two chambers. In the exemplary embodiment, three elastomeric seals 313, 315, and 317 are utilized to secure piston 305 to an inner surface 319 of housing 307.

Damper 303 is shown pivotally attached to yoke 301 via a piston rod 321, and pivotally attached to rotor blade 107 via a fastener 323 that attaches to housing 307.

During operation, the elastomeric materials and fluid passing between the two chambers operate to dampen the forces exerted on the rotor yoke via the rotor blade, as depicted with arrow "D" in the drawings. In the illustrative embodiment, damper 303 is configured to reduce lead/lag forces of the rotor blade. Of course, it will be appreciated the features discussed herein could be incorporated on other types of dampers that dampen different forces in lieu of the preferred embodiment.

Figure 5:
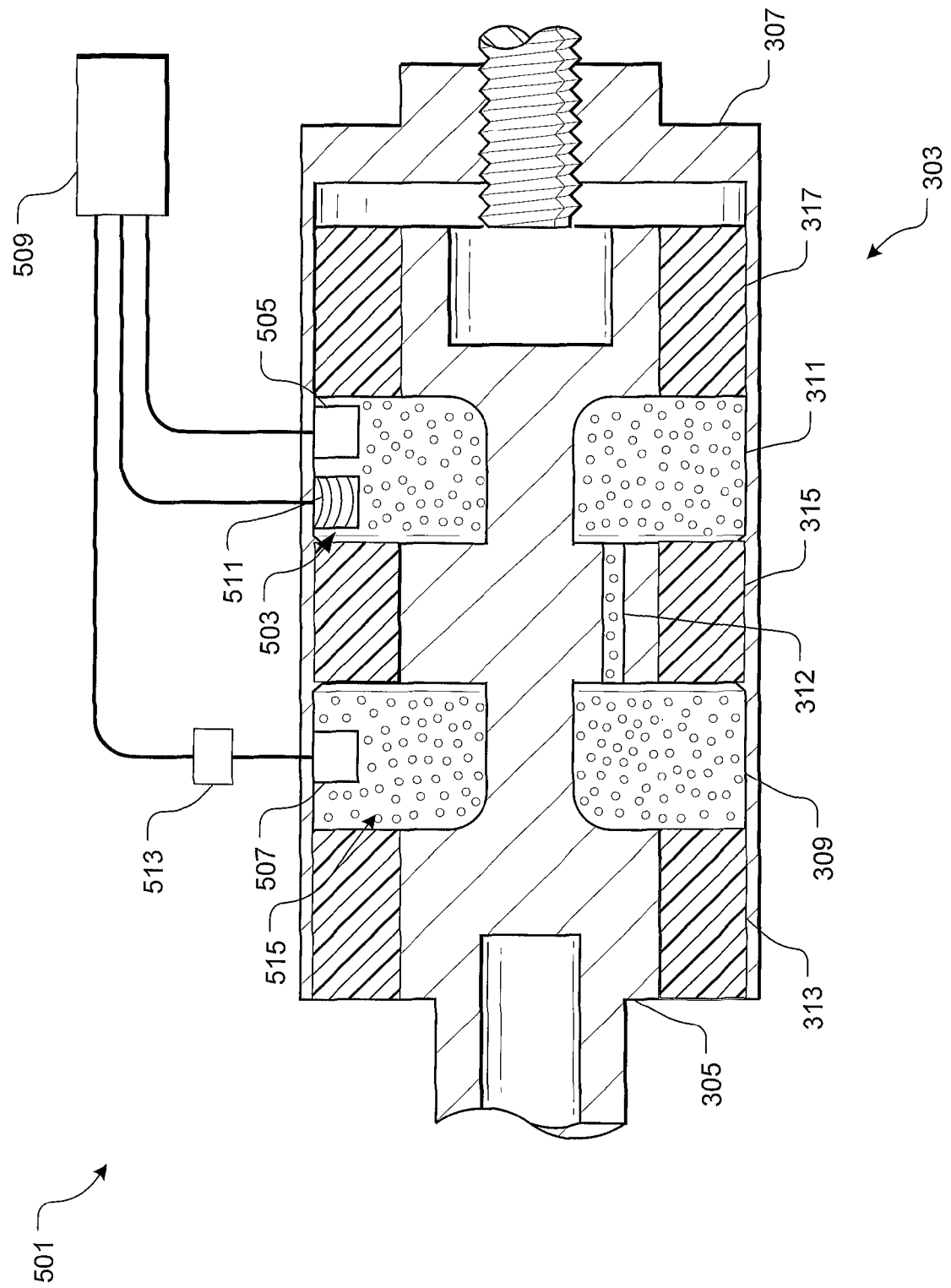
FIG. 5 is a cross-sectional view of the damper of FIG. 3 and a damper system in accordance with the preferred embodiment.

FIG. 5 depicts a damper system 501 in accordance with the preferred embodiment of the present application. Damper system 501 includes one or more of a heater 503, a sensor 505, an electrical subsystem 507, and a control subsystem 509; all being operably associated with damper 303.

Heater 503 is configured to provide heat energy, for example, provide heat energy to the elastomeric material and to the fluid of damper 303. In the contemplated embodiment, heater 503 includes a plurality of coils 511 disposed within chamber 311; however, it will be appreciated that alternative embodiments could include other types of heating means positioned within the chamber.

One unique feature believed characteristic of the present application is warming the components of the damper with heat energy from the heater prior to flight. This feature greatly reduces the time and costs associated with preparing the aircraft for flight. It should be appreciated that these features overcome the problems commonly associated with conventional damper systems.

Electrical subsystem 507 is configured to provide electrical energy to the fluid disposed within damper 303. In the contemplated embodiment, electrical subsystem 507 is positioned within chamber 309 and conductively coupled to an electrical energy source 513. During operation, the electrical subsystem 507 induces electrical energy in the fluid. To achieve this feature, fluid 515 is an electrorheological fluid that changes in viscosity as electrical energy is added "induced."

Another unique feature believed characteristic of the present application is changing the spring rate of damper 303 in real time by changing the viscosity of the fluid by utilizing the electrorheological fluid and the electrical subsystem 507. Thus, the damper allows selective controlling of the spring rate in real time according in accordance with different flight conditions. This feature overcomes the problems commonly associated with dampers, for example, dampers having a single spring rate.

In the contemplated embodiment, sensor 505 is operably associated with both heater 503 and electrical subsystem 507 for sensing energy output and operation of damper 303, and is configured to relay the sensed data to control subsystem 509. The control subsystem 509 then either autonomously or manually regulates to heat and/or electrical input, thereby warming the components of damper 303 and/or changing the spring rate by regulating the electrical energy.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system, comprising:
    a damper, having:
        a housing;
        a piston elastically attached to an inner surface of the housing via an elastomeric material; and
        a first fluid chamber and a second fluid chamber positioned within the piston, and on opposing ends of the piston, and in fluid communication with each other via a fluid passage;
    a heater configured to provide heat energy to the the first fluid chamber, the heater being in fluid communication with the first fluid chamber; and
    a control subsystem operably associated with the heater and configured to regulate heat energy to the first fluid chamber.

2. The system of claim 1, wherein the
    fluid passage extends through the piston; and
    wherein the fluid passage is configured to channel fluid from the first chamber to the second chamber.

3. The system of claim 1, further comprising:
    a sensor operably associated with the control subsystem;
    wherein the sensor is configured to sense heat energy from the heater.

4. The system of claim 3, wherein the sensor is disposed within the housing.

5. The system of claim 3, wherein the sensor and the heater are both disposed within the housing.

* * * * *